United States Patent [19]

Christianson

[11] 4,263,873
[45] Apr. 28, 1981

[54] ANIMAL LITTER AND METHOD OF PREPARATION

[76] Inventor: George Christianson, 18210 30th Pl. North, Plymouth, Minn. 55447

[21] Appl. No.: 21,345

[22] Filed: Mar. 19, 1979

[51] Int. Cl.³ ............................................ A01K 1/015
[52] U.S. Cl. ....................................................... 119/1
[58] Field of Search ............................... 119/1; 424/84

[56] References Cited

U.S. PATENT DOCUMENTS

| | | | |
|---|---|---|---|
| 2,477,892 | 8/1949 | Paquette | 119/1 |
| 2,708,418 | 5/1955 | Sugarman | 119/1 |
| 3,059,615 | 10/1962 | Kuceski et al. | 119/1 |
| 3,983,842 | 10/1976 | Marion et al. | 119/1 |
| 4,158,096 | 6/1979 | Anderson | 424/84 |
| 4,203,388 | 5/1980 | Cortigene et al. | 119/1 |

OTHER PUBLICATIONS

Windholz et al., "The Merck Index", 1976, pp. 952–953.

*Primary Examiner*—Hugh R. Chamblee
*Attorney, Agent, or Firm*—Peterson, Palmatier, Sturm & Sjoquist, Ltd.

[57] ABSTRACT

The animal litter comprises a cellulose litter material that contains a pheromone-like attractant substance which makes the litter attractive to animals seeking a place to defecate and/or urinate. The litter material is pelletized to give the litter a consistency comparable to that of fine gravel. The pellets formed from the litter material hydrate slowly but positively and are disposable in water. The density of the pellets is such that they retain their structural integrity on hydration. The pellets are formed from ground paper which has been moistened with sufficient water to hold the particles together but not so much as to cause the pellets to feel moist. An acid salt may either be added in the water or as a dry powder to the ground paper. This salt carried by the water in the pellets neutralizes the animal urine (and the ammonia-like compounds formed from it) while maintaining the pH of the litter at a level acceptable to the animals. A pheromone-like attractant substance is added to the pellets either with the water or by spraying it on the finished pellets. A further step comprises compacting the saturated, ground paper into pellets having the previously enumerated properties.

28 Claims, 1 Drawing Figure

ANIMAL LITTER AND METHOD OF PREPARATION

BACKGROUND OF THE INVENTION

1. Field of the Invention

The present invention relates to an animal litter and method of preparation of animal litter and, more particularly, to an animal litter with chemical additives and physical properties which increase the attractiveness of the litter to the animal.

2. Description of the Prior Art

Prior to the development of the present animal litter, principally three types of litter material were known: clay and expanded clay; alfalfa or grass pellets; and wood chips or sawdust. Each of these types of materials has serious disadvantages when used as a litter base. Clay, because of its high density, is difficult to carry in quantities sufficient for an extended period of use. Even more serious is the disposal problem associated with clay. Clay cannot be disposed of directly on a lawn, nor can it be emptied into the garbage or in the garden. Yacono (U.S. Pat. No. 4,007,708) discloses one such clay-type litter.

Alfalfa or grass pellets also have serious deficiencies. Because these types of litter are edible by bacteria, they tend to mold and develop unpleasant odors. Paper, on the other hand, is not as likely to be subject to bacterial growth. Brewer (U.S. Pat. No. 3,789,797) discloses a cat litter product prepared with an alfalfa base.

A third kind of litter is made from sawdust, wood chips or bark and fiber crumbs. These litter materials are not effective because they have a wood odor that is unpleasant to the animal. In addition, these pellets are not as absorbent as paper. Cellulose will absorb more water because it does not have lignan and wood tars and turpentines. Neubauer (U.S. Pat. No. 3,980,050) is one such litter made from bark and fiber crumbs.

White (U.S. Pat. No. 3,828,731) discloses an animal litter product consisting of soft and fluffy paper shavings. The problem with the use of paper shavings is that they stick to the feet of the animal after use. With use, the litter is spread outside of the litter tray and is disliked by the animal because the paper shavings adhere to its feet.

In addition to the deficiencies of the known animal litters as enumerated above, there are other important problems associated with their use. The most important of these is related to the effectiveness of the prior art litters. A common problem associated with the use of an animal litter is that of training the animal to use the litter with a high level of consistency. None of the prior art litters incorporates any features which would make the litter particularly attractive to the animal. While many of these litters contain an odor-inhibiting or masking substance to mask or prevent the formation of odors undesirable to humans, none of the litter products contains a substance that makes the litter attractive to animals. In addition, the physical characteristics of the prior art litters has been predicated by the availability of litter materials. As a result, the characteristics of some of these litter materials, such as paper shavings, is particularly unattractive to the animal. None of the prior art litters is prepared to duplicate the consistency or moisture content of soil or preferably that of fine gravel—yet a soil-like or fine gravel material is the most attractive type of material for an animal seeking a place to defecate and/or urinate.

None of the prior art discloses the use of pelletized paper as the main litter ingredient. Brewer (U.S. Pat. No. 3,921,581) discloses the pelletizing of particles, but applies it only to the solid excipients which are used as additives to the cat litter rather than the cat litter product itself. The Brewer patent (U.S. Pat. No. 3,789,797) discloses pelletizing the cat litter product, but in a form which involves merely tumbling the mixture together so that it adheres in a snowball form in a noncompacted state. As will be discussed later, there are a number of advantages associated with the use of paper pellets as the litter material.

SUMMARY OF THE INVENTION

The animal litter comprises a moisture-absorbent litter material that contains a pheromone-like attractant substance which makes the litter attractive to animals seeking a place to defecate and/or urinate. The litter material is pelletized to give the litter a consistency comparable to that of moist soil. The pellets have a density sufficient to ensure their structural integrity on hydration, yet low enough that hydration readily occurs. The pelletized litter material is disposable in water. The water content of the litter, 10–25% (by dry weight), gives the litter a water content comparable to that of moist soil. Normally, the litter material contains an acid salt that neutralizes animal urine while maintaining the pH of the litter at a level acceptable to animals.

In its specific preferred form, the animal litter is made of cellulose pellets that have a density of approximately one cubic centimeter per gram. The pheromone-like attractant substance in the litter is a mixture specially prepared by Polok Fructal Works and is 100–5,000 ppm (by weight) of the litter. The particular acid salt employed in the litter is sodium acid sulfate. It is used in a quantity sufficient to maintain the pH of the litter between 4 and 4.5.

The initial step in preparing the animal litter comprises adding the pheromone-like attractant substance to water although such pheromone can be added at the end of the preparation process by spraying the same on the finished pellets. The acid salt may be added to the resulting aqueous solution either before or after the addition of the pheromone-like substance. Alternatively, the acid salt may be added in powder form directly to ground paper. The aqueous solution containing the pheromone-like substance (and, alternatively, the acid salt) is then mixed with the ground paper in quantities such that the paper has a water content of 10–25% (by dry weight) of the litter, which is comparable to that of moist soil. The method of preparation of the animal litter may further comprise the compacting of the ground paper into pellets after the resulting aqueous solution has been absorbed. The litter material is pelletized so that the consistency of the litter is comparable to that of moist soil or preferably fine gravel.

The present invention minimizes or eliminates those problems that existed in the prior art. One of the important advantages associated with the use of cellulose as the litter material is that it is biodegradable and easily disposable. Paper pellets may be easily flushed down the toilet, or disposed of in the garden or in the garbage. Another advantage associated with the use of cellulose is the existence of naturally occurring buffers in the cellulose itself. These naturally occurring buffers enhance the effect of the acid salts that are added to the litter material. Cellulose also is a particularly attractive litter material because it is very absorbent, and it is not as susceptible to microorganisms as materials such as hay or alfalfa.

Another of the important advantages associated with the use of the present animal litter is its degree of effectiveness as a litter. As already indicated, one of the major drawbacks of the prior art litters was their marginal level of effectiveness. In contrast, the present animal litter is highly effective for several reasons: First, because of the pheromone-like attractant substance added to the litter, the animal is naturally attracted to the litter when seeking a place to deposit its urine or feces. While other litters use an odor-inhibiting or masking substance to mask or prevent the formation of undesirable odors, none of the prior art litters incorporates a substance that actually attracts the animal to the litter. Second, the physical and chemical properties of the present animal litter are unlike those of any of the prior art litters. By adding water to the litter material and pelletizing the litter material, the litter approximates the texture and consistency of moist soil or preferably fine gravel. Animals that naturally use the soil to void themselves find the present litter material an acceptable substitute. In contrast, the prior art litter materials either stick to the feet of the animal, or exude odors that are unpleasant to the animal. Thus, pelletizing the litter material not only eliminates the disposal problems, but also enhances the attractiveness of the litter to the animal. Thirdly, the odor is neutralized with a material such as an acid salt. Fourthly, it is disposable by flushing down a toilet. Fifthly, it does not have a dusty nature when dry or a muddy nature when wet.

Other features and modifications of the invention will be apparent from the following detailed description and claims.

BRIEF DESCRIPTION OF THE DRAWING

In the drawing which forms a part of this application.

DESCRIPTION OF THE PREFERRED EMBODIMENT

Figure 1:
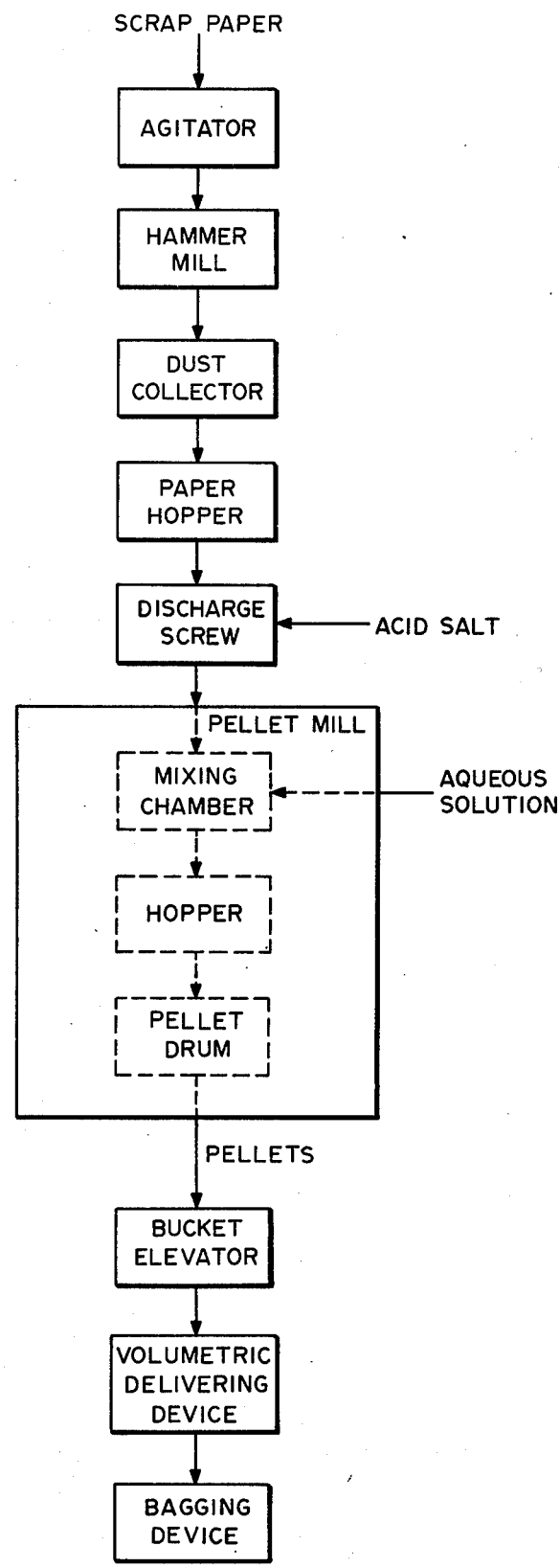
FIG. 1 is a flow diagram of the method by which the animal litter is prepared.

The animal litter comprises cellulose pellets. Currently, the pellets are made from hot melt paper, which is the trimming from books and magazines. Virtually any kind of paper, with the exception of those with a high clay content, may be used to form the pellets. Hot melt scrap paper is used because of its availability and low cost.

The pellets typically have a density of one cubic centimeter per gram. A density in the range of 0.75 cubic centimeters per gram to 1.1 cubic centimeters per gram is preferred: if the pellets have a density beneath this range, they are too fragile and will tend to break apart and adhere to the feet of the animal; if the density of the pellets is above the preferred density range, the pellets become glassy, almost like coal, and will not readily absorb water.

The preferred size of the pellets is approximately 0.5 centimeters in diameter by 1.25 centimeters in length, although diameters of approximately 0.16 to 0.80 centimeters and lengths of slightly more than 0.5 centimeters are acceptable. A typical bulk density for the animal litter is 2.4 cubic centimeters per gram. The $0.5 \times 1.25$ centimeter size was chosen because it gives the litter a texture similar to that of soil and keeps the dust generated by the pellets to a minimum. In addition, pellets of this size can be readily disposed of in the sewer system or in the garbage.

Preferably, the pellets have a moisture content of 15 to 16% (by dry weight) of the litter however, a moisture content in the range of 10-25% is acceptable. The moisture in the pellets is essential to give the pellets their structural integrity. A moisture level under 10% would make it difficult to pelletize the litter material. On the other hand, a moisture content that is too high may create spoilage problems, although cellulose pellets are not as susceptible to spoilage as is hay. In addition to facilitating the pelletizing of the litter material, the moisture in the pellets makes the litter more attractive to the animal using the litter. A moisture content in the preferred range gives the litter the characteristics of moist soil.

The litter also contains a chemical substance that imparts an odor to the litter that is attractive to animals seeking a place to defecate and/or urinate. In this respect, the present animal litter differs fundamentally from prior art litter in which the litter odor was selected to be attractive to the animal owner. The odor used has a smell apparently similar to that of an animal pheromone. Pheromones are chemicals which are secreted or excreted by one animal that affect the behavior of other animals of the same species. For example, a dog has in its urine pheromones that enable it to stake out its territory. The male moth is attracted to the female moth because of her sex-attractant pheromones. The chemical used in the present animal litter has a musty, damp, sour-like odor similar to that of mushrooms. The chemical is available from Polok Fructal Works, Middletown, New York, a division of Hercules. The principal distinction between the pheromone-like attractant substance and other odor additives is that the primary purpose of the pheromone-like substance is not to mask the odor of the litter, but rather to attract the animal to the litter. The preferred concentration of the pheromone-like attractant substance is approximately one part per thousand by weight, although a concentration in the range of 100–5,000 ppm by weight is acceptable.

Another important component of the animal litter is the acid salt, which neutralizes the urine (and ammonia type compounds derived from urine) of the animal and buffers the litter. By neutralizing the urine, the acid salts prevents the formation and release of ammonia odors resulting from the urine. The preferred acid salt for the animal litter is sodium acid sulfate. That particular acid salt was chosen because it is inexpensive and readily available. Alternatively, nitric, phosphoric or hydrocloric acid salts, among others, could be used. In addition, a borax, boric acid mixture would be effective because it is both acidic and a deodorant. All of these mixtures are capable of preventing ammonia formation and buffering the litter to control the pH.

The preferred pH of the litter is in the range of 4 to 4.5, which is the acid strength of sour milk. A pH level in the range of 4 to 4.5 ensures that the litter is not too acidic for the animal, although a pH range from 1 to 5.5 is acceptable. Over the preferred range, the sodium acid sulfate is used in a concentration of 1–2%. If more than 2% sodium acid sulfate is used, the pH drops below 4. If the sodium acid sulfate concentration is below 1%, the pH rises considerably over 4.

While the most important contribution to the buffering effect is from the added acid salt, the cellulose itself acts as a buffer as a result of the naturally occurring sulfates and other chemicals in the cellulose.

The preferred method of preparation of the animal litter is as follows. First, reasonably clean baled paper, such as hot melt scrap paper, is run through an agitator to evenly disperse the paper. From the agitator it enters a hammer mill with approximately ¼ inch holes. Newspaper or cardboard boxes also could be used. The ground paper is then blown into a dust collector comprising a cyclone collector and a stocking dust collector. The dust collector allows the paper to settle in a paper hopper. From the bottom of the hopper the paper is conveyed by a discharge screw to a pelletizer. Dry sodium acid sulfate is added to the paper as it is discharged from the hopper.

The pelletizer used is a California Pellet Mill. The pellets could be formed or compacted in a pharmaceutical tablet press, an extruder or some variation of an extruder. In the pelletizer, the ground paper enters a mixing chamber where it is mixed with an aqueous solution containing the pheromone-like substance. Alternatively, the pheromone could be added at the end by spraying on the pellets. Also, the sodium acid sulfate could be added to the mixing chamber either in a separate stream or in the same stream as the aqueous solution. From the mixing chamber, the wetted ground paper is transferred to a hopper and then is conveyed into the pellet drum of the pellet mill. The pellets formed drop onto a conveyor belt that carries the pellets to a bucket elevator, which in turn carries the paper over a ¼ inch screen. The fines from the paper drop back to the mixing chamber while the pellets are carried into a volumetric delivering device for bagging.

The details of the step in which the litter material is compacted into pellets are of importance. If the cellulose is pelletized too lightly, the resulting pellets tend to fall apart. On the other hand, if the cellulose litter material is pelletized until it is glassy, almost like coal, it will not absorb any water. It is therefore imperative that the litter material be pelletized until it is firm enough to stay together and yet not so tight it will not absorb water. The proper density and size of the pellets are controlled by the size of the pellet mill hole, the taper of the hole, the moisture content of the pellets and the temperature at which the pellet machine is operated. These parameters seem to vary with each pellet mill used. The contribution of various parameters, however, is apparent: as moisture is added, the pellets become more dense; as the holes are made smaller, the pellets become more dense; as the hole through which the pellets are driven is lengthened, the pellets become more compact. Each of these parameters may be varied until the optimum pellet density is achieved. As previously indicated, a density of one cubic centimeter per gram produces pellets with the best combination of physical characteristics.

Although the preferred embodiment and method of preparation of the animal litter have been described in detail, it is contemplated that various modifications could be made to the structure of the preferred embodiment and to the method of preparation by those skilled in the art without deviating from the spirit and scope of the present invention. Accordingly, the scope of the present invention should not be dictated solely by the description of the preferred embodiment.

I claim:

1. An animal litter, which comprises a moisture absorbent paper material having a density in the range of 0.75 cubic centimeters per gram to 1.1 cubic centimeters per gram that contains a pheromone-like attractant substance which makes the litter attractive to animals seeking a place to defecate and/or urinate and wherein the pheromone-like attractant substance is 100–5,000 parts per million (by weight) of the litter.

2. The animal litter of claim 1, wherein the water content of the paper material is 10–25% (by dry weight) of the litter, the water content being comparable to that of moist soil.

3. The animal litter of claim 2, wherein the paper material is pelletized so that
   a. the consistency of the paper material is comparable to that of moist soil;
   b. the pellets hydrate readily and are disposable in water; and
   c. the pellets are sufficiently dense within said density range that they retain their structural integrity on hydration.

4. The animal litter of claim 3, wherein the individual pellets have a density of approximately one cubic centimeter per gram.

5. The animal litter of claim 4, wherein the pellets comprise scrap paper.

6. The animal litter of claim 5, wherein the pellets are made of hot melt paper.

7. The animal litter of claim 1, 2 of 3, wherein the paper material contains an acid salt that neutralizes animal urine while maintaining the pH of the litter at a level acceptable to animals.

8. The animal litter of claim 3, wherein the paper material contains an acid salt which maintains the pH of the litter between 4 and 4.5.

9. The animal litter of claim 9, wherein the acid salt is sodium acid sulfate.

10. An animal litter, which comprises a moisture absorbent paper material that is pelletized so that
    a. the consistency of the litter is comparable to that of moist soil;
    b. the pellets hydrate readily and are disposable in water; and
    c. the pellets have a density in the range of 0.75 cubic centimeters per gram to 1.1 cubic centimeters per gram and are sufficiently dense that they retain their structural integrity on hydration.

11. The animal litter of claim 10, wherein the pellets comprise scrap paper.

12. The animal litter of claim 11, wherein the pellets are made of hot melt paper.

13. The animal litter of claim 10 or 12, wherein the water content of the litter is 10–25% (by dry weight) of the litter, the water content being comparable to that of moist soil.

14. A method of preparing an animal litter, which comprises the steps of
    a. adding a pheromone-like attractant substance to water to form an aqueous solution, the pheromone-like attractant substance having the property of making the litter attractive to animals seeking a place to defecate and/or urinate;
    b. adding an acid salt to ground paper either before or after step a, the acid salt having the property of neutralizing animal urine while maintaining the pH of the litter at a level acceptable to animals; and
    c. mixing the aqueous solution with the ground paper in quantities such that the paper has a water content of 10–25% (by dry weight) of the litter, the water content being comparable to that of moist soil.

15. A method of preparing an animal litter, which comprises the steps of
   a. adding a pheromone-like attractant substance and an acid salt to water to form an aqueous solution, the pheromone-like attractant substance having the property of making the litter attractive to animals seeking a place to defecate and/or urinate, the acid salt having the property of neutralizing animal urine while maintaining the pH of the litter at a level acceptable to animals; and
   b. mixing the aqueous solution with ground paper in quantities such that the paper has a water content of 10–25% (by dry weight) of the litter, the water content being comparable to that of moist soil.

16. The method of claim 14, further comprising compacting the ground paper into pellets after the aqueous solution has been absorbed therein so that
   a. the consistency of the litter is comparable to that of moist soil;
   b. the pellets hydrate readily and are disposable in water; and
   c. the pellets are sufficiently dense that they retain their structural integrity on hydration.

17. The method of claim 15, further comprising compacting the ground paper into pellets after the aqueous solution has been absorbed therein so that
   a. the consistency of the litter is comparable to that of moist soil;
   b. the pellets hydrate readily and are disposable in water; and
   c. the pellets are sufficiently dense that they retain their structural integrity on hydration.

18. The method of claim 16 or 17, wherein the individual pellets have a density of approximately one cubic centimeter per gram.

19. The method of claim 16 or 17, wherein the pheromone-like attractant substance is 100–5,000 parts per million (by weight) of the litter.

20. The method of claim 16 or 17, wherein the ground paper is made from hot melt paper.

21. The method of claim 16 or 17, wherein the acid salt in the litter is sodium acid sulfate in sufficient quantity to maintain the pH between 4 and 4.5.

22. The method of claim 18, wherein
   a. the pheromone-like attractant substance is 100–5,000 parts per million (by weight) of the litter;
   b. the ground paper is made from hot melt paper; and
   c. the acid salt in the litter is sodium acid sulfate in sufficient quantity to maintain the pH between 4 and 4.5.

23. An animal litter, which comprises a moisture-absorbent litter material of pelletized scrap hot melt paper that contains a pheromone-like attractant substance which makes the litter attractive to animals seeking a place to defecate and/or urinate wherein the water content of the litter is 10–25% (by dry weight) of the litter, the water content and consistency of the litter being comparable to that of moist soil and in which the pellets hydrate readily and are disposable in water and in which the pellets are sufficiently dense that they retain their structural integrity on hydration, the pellets having a density of approximately one cubic centimeter per gram, wherein the pheromone-like attractant substance is 100–5,000 parts per million (by weight) of the litter, and the litter material contains sodium acid sulfate to neutralize animal urine while maintaining the pH of the litter between 4 and 4.5.

24. An animal litter comprising a plurality of individual pellets of ground paper having a density in the range of 0.75 cubic centimeters per gram to 1.1 cubic centimeters per gram and having a moisture content of 10–25% (by dry weight) of the litter and a thickness of from 0.16–0.80 centimeters.

25. The animal litter of claim 24 in which said moisture content is 15–16% (by dry weight) of the litter and said density is one cubic centimeter per gram.

26. The animal litter of claim 25 in which the cross section of said pellets is generally circular and the diameter thereof is said 0.16–0.80 centimeters.

27. The animal litter of claim 26 in which said pellets have a length of approximately 1.25 centimeters.

28. A method of preparing an animal litter, which comprises the steps of adding a pheromone-like attractant substance to water to form an aqueous solution and mixing said aqueous solution with ground paper in quantities such that the paper has a water content of 10–25% (by dry weight) of the litter, and compacting the ground paper into pellets after the aqueous solution has been absorbed therein so that
   a. the consistency of the litter is comparable to that of moist soil;
   b. the pellets hydrate readily and are disposable in water; and
   c. the pellets are sufficiently dense that they retain their structural integrity on hydration, wherein the pheromone-like attractant substance is 100–5,000 parts per million (by weight) of the litter, and the litter material contains an acid salt in sufficient quantity to maintain the pH between 4 and 4.5.

* * * * *